April 2, 1935. C. A. HENNEUSE 1,996,723
SCOOP
Filed May 26, 1932   6 Sheets-Sheet 3

INVENTOR.
Clarence A. Henneuse
BY
Fay, Oberlin & Fay
ATTORNEYS

April 2, 1935.   C. A. HENNEUSE   1,996,723
SCOOP
Filed May 26, 1932   6 Sheets-Sheet 4

INVENTOR.
Clarence A. Henneuse
BY
Fay, Oberlin & Fay
ATTORNEYS

April 2, 1935.　　C. A. HENNEUSE　　1,996,723
SCOOP
Filed May 26, 1932　　6 Sheets-Sheet 5

INVENTOR.
Clarence A. Henneuse
BY
Fay, Oberlin & Fay
ATTORNEYS

Patented Apr. 2, 1935

1,996,723

UNITED STATES PATENT OFFICE 1,996,723

SCOOP

Clarence A. Henneuse, Bucyrus, Ohio

Application May 26, 1932, Serial No. 613,605

10 Claims. (Cl. 37—129)

This invention relates, as indicated, to scoops and has more particular reference to the form of construction of a material handling apparatus commonly referred to in the field as a wheeled scoop, comprising a material supporting, handling and conveying bowl, supporting wheels for such bowl, and mechanism for actuating the bowl into and out of the several operating positions.

As is well known to those familiar with the art, wheeled scoops usually comprise a bowl carried by ground wheels and suitable mechanism is provided for movably supporting the bowl relative to the axis of the wheels so that the same may be moved into a gathering position, from a gathering position into a conveying position and from a conveying position into a dumping position. The mechanism for supporting and actuating the bowl in the above defined manner should be capable of moving the bowl from any position to another position regardless of any particular sequence of operations.

It is among the objects of this invention to provide a form of scoop construction in which the bowl is actuated either from the ground wheels or from the tractor or like mechanism drawing the scoop, such actuating means for the bowl being positive and hence, capable of effecting the proper manipulation thereof most efficiently when required by the operator of the device.

It is a further object of this invention to provide an actuating means for the scoop bowl which shall move such bowl in a fashion which reduces to a minimum the resistance encountered by the bowl in moving into and out of the several operating positions, particularly the gathering position. Other objects of my invention will appear as the description proceeds.

To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
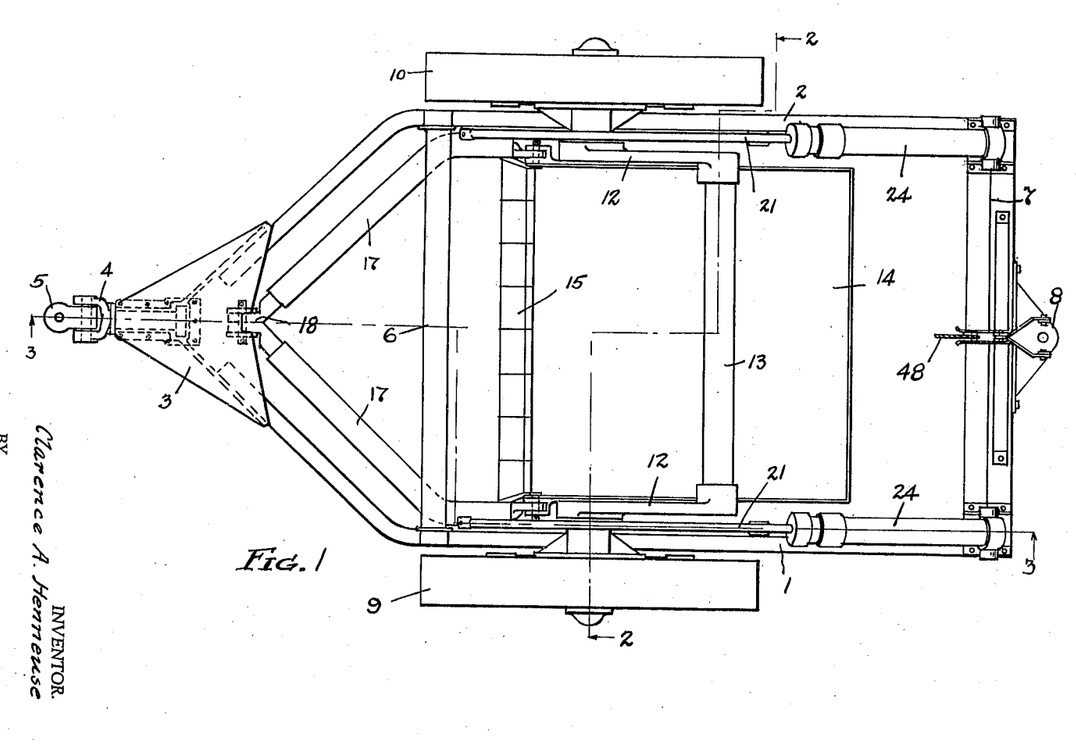
Fig. 1 is a plan view of a scoop constructed in accordance with the principles of my invention.
Figures 2, 3:
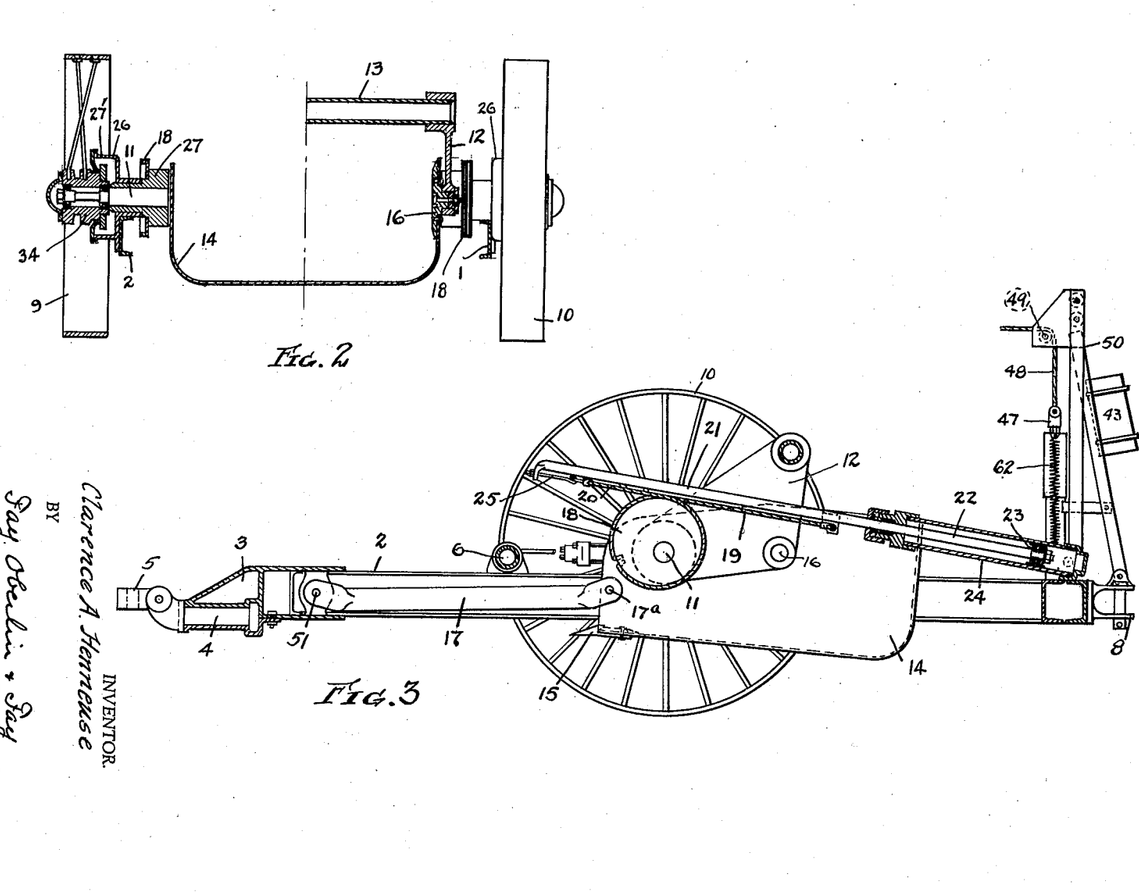
Fig. 2 is a transverse sectional view of the apparatus illustrated in Fig. 1 taken on a plane substantially indicated by the lines 2—2.
Fig. 3 is a part sectional, part side elevational view of the scoop illustrated in the previous figures taken on a plane substantially indicated by the line 3—3 in Fig. 1.

Referring now more specifically to the drawings and more especially to Figures 1, 2 and 3, it will be noted that the scoop comprising my invention consists of a main frame including side frame members 1 and 2 which, as most clearly illustrated in Fig. 2, are channel-shaped, although any particular form of cross-section might be employed. The side frame members 1 and 2 converge forwardly of the scoop and have a bracket member 3 joined thereto and interconnecting the same, which provides the anchorage means for a swivel bolt 4 carrying a clevis member 5 by means of which the scoop is drawn by attachment either to the rear end of a tractor or like means or the rear end of another scoop, if several units are employed in a train.

The forward end of the side frame members 1 and 2 may be cross-braced by a frame member 6 and the rear end of such members are interconnected by a transversely extending sill 7 which, at its rear central portion, carries a coupling bracket 8 adapted to receive a coupling member such as 5 of the next succeeding entrained scoop. Two ground wheels 9 and 10 respectively, are positioned on opposite sides of the frame and are rotatably supported, as most clearly illustrated in Figure 2, on short stub axles 11 by friction reducing bearings such as are most clearly illustrated in Figure 5. Mounted on the inner ends of the stub axles 11 are triangular-shaped frame members 12, which are interconnected and cross-braced by a tubular member 13.

Hung between the triangular members 12, in the manner hereinafter more fully explained, is a scoop bowl, generally indicated at 14, which has been illustrated as of conventional design with a forward cutting edge 15 which, when brought into collecting engagement with the ground will scoop up the material to be collected, transported and subsequently dumped by the scoop.

Figure 5:
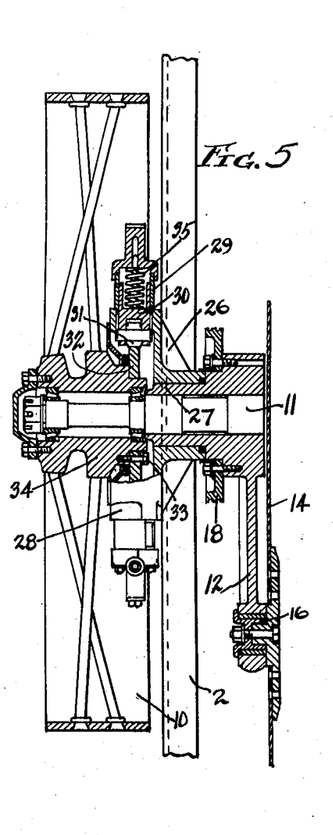
Fig. 5 is a part sectional, part side elevational view of the apparatus illustrated in Fig. 4.

As most clearly illustrated in Figure 5, the opposite sides of the bowl 14 have trunnions, generally indicated at 16, associated therewith which are oscillatably engaged by a suitable bearing-lined aperture in the triangular frame members 12. Oscillatably secured to the forward edges of the sides of the bowl 14 are arms 17 which, at their forward ends, generally indicated at 18 in Figure 1, are oscillatably secured in the bracket member 3.

Manipulation of the bowl 14 into its several operating positions is effected by substantially circular drums 18 which, as most clearly illustrated in Fig. 5, are rigidly secured to the triangular-shaped members 12. The outer peripheries of the drums 18 are formed with axially spaced grooves adapted to receive cables 19 and 20 which are trained about and at one end secured to such drums 18 in the manner most clearly illustrated in Figure 3. The free ends of the cables 19 and 20 are secured to the extension 21 of piston rods 22. The pistons 23 carried by the rods 22 are slidable within cylinders 24 respectively positioned on opposite sides of the scoop and at their rear ends, preferably oscillatably supported in brackets on the side frame members 1 and 2 or extensions of the rear cross sill. Adjustment of the cables is provided by means of adjustable anchor bolts 25 secured to the front end of the piston arms and securing the forward end of the cables 20.

For the actuation of the pistons 23 within the cylinders 24 to effect a manipulation of the scoop bowl, I preferably employ some substantially incompressible fluid, such as oil, or the like. In the preferred embodiment of this invention, as illustrated in the drawings, the fluid pressure for actuating the pistons within the cylinders is generated by means mounted directly on the scoop so that the complete fluid system for operating the bowl is self-contained and requires no connection to the tractor or similar motive power.

This means for generating the requisite fluid pressure for actuating the scoop bowl comprises a plurality of pumps for such fluid which are mounted adjacent and actuated by the rotating ground wheels of the vehicle.

Secured to the side frame members 1 and 2 adjacent the axes of the wheels are casing members, generally indicated at 26 in Figures 2 and 5, which are rotatably supported on axially extending hubs 27 of the members 12. Each casing 26 has an axially extending flanged portion 27' which supports fluid pumps 28. The fluid pumps 28 consist principally of cylinders 29 in which are mounted for reciprocation, pistons 30 which, at their lower ends, carry cam rollers 31. The cam rollers 31 are adapted to ride on a cam 32 which is secured by means of bolts, such as 33, to the hubs 34 of the wheels 9 and 10. The cam rollers 31 are maintained in engagement with the cam 32 by spring means 35.

Figure 4:
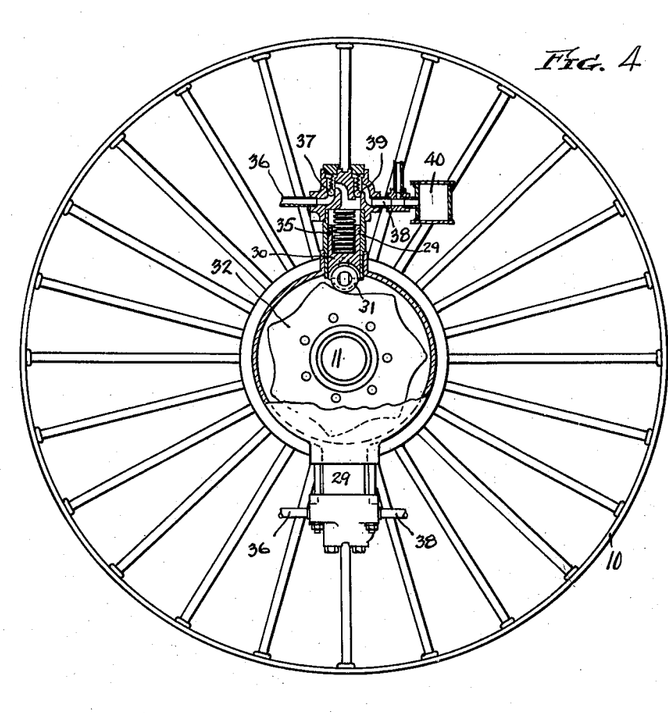
Fig. 4 is a side elevational view partially in section of one of the supporting wheels of the scoop showing in association therewith, partially in section and partially in elevation, one of the fluid pumps and its actuating mechanism.

The particular construction of the pumps will not be given in any greater detail than to point out that the fluid is supplied thereto by means of a conduit 36, as most clearly illustrated in Figure 4, through a check valve 37 and is exhausted therefrom through an outlet pipe 38 and also through a check valve 39. Associated with each pump is a surge chamber 40 designed for the purpose hereinafter more fully explained. The co-relation of the several pumps and the action of the fluid pressure generated thereby will be explained more in detail by having reference to the diagrammatic representation of the fluid system for the scoop as is most clearly illustrated in Figure 6.

Figure 6:
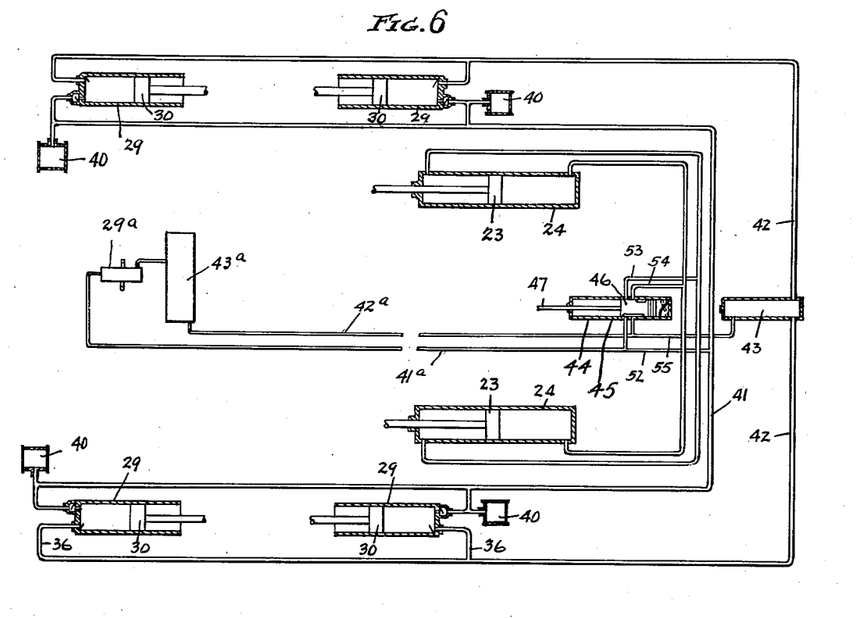
Fig. 6 is a schematic diagram of the fluid circuit of the actuating mechanism for the scoop bowl.

In this last-named figure, it will be noted that four pumps are illustrated and the preferred arrangement of such pumps is at diametrically opposed points on the two wheels of the scoop, although any other suitable arrangement might be adopted.

It will be noted that the common pressure line 41 connects all of the outlet conduits 38 of the pumps and conduits 42 lead along opposite sides of the scoop from a sump tank 43 to the inlet conduits 36 on the several pumps. The fluid under pressure from the pressure conduit 41 is distributed to the cylinders 24 by a single valve means, the conception and operation of which will now be described.

The main distributing valve, generally indicated at 44, comprises a cylinder 45 in which is slidably mounted a grooved piston 46. The piston is moved axially within the cylinder 45 by means of a rod 47 to the end of which, as most clearly illustrated in Figure 3, is attached a cable which passes over a sheave 49 carried by an upright bracket member 50 on the rear still 7 and such cable will be carried forwardly either to the tractor drawing the scoop so that operator of the tractor may control the valve, or to the central operator's platform on which may be positioned an operator for controlling one or more of the scoops.

By having reference to Figure 3 it will be noted that for the pistons 23 to move the scoop bowl 14 from the carrying position herein illustrated to either the collection position or the dumping position, it will be necessary for such pistons to move axially to the right and left, respectively, from the illustrated position. As the pistons move to the right, the drum sheave 18 will be rotated in a clockwise direction effecting a clockwise rotation of the triangular bracket members 12 about the axes of the stub shafts 11, lowering the rear end of the bowl and permitting the front end of the bowl to be lowered by a clockwise rotation of the arms 17 about the axis 51. Should the pistons 23 move to the left from the position illustrated in Figure 3, the triangular-shaped members 12 would be rotated in a counter-clockwise direction and the rear end of the scoop bowl elevated to a point where the bottom of the scoop would occupy a substantially vertical position. This movement of the pistons 23 is effected by a manipulation of the distributing valve 44 in the manner most clearly illustrated in Figures 7 to 10.

Before passing to the description of these figures, it should be noted that the cylinder 45 of the valve has a conduit 52 leading thereinto from the pressure pipe 41. On the opposite side of the valve, conduits 53 and 54, respectively, lead from the valve cylinder to the actuating cylinders 24 on opposite sides of the bowl actuating pistons 23. A return conduit 55 leads from the valve cylinder or casing 45 back to the sump tank 43.

Referring now more specifically to Figures 7 to 10, the several positions of the valve piston 46 within the cylinder 45 will be described by having reference to the fluid flow in the circuit for each such position.

Figure 7:
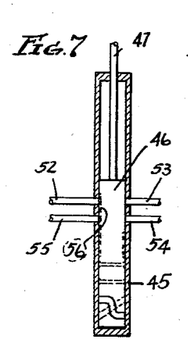
Figures 7, 8, 9 and 10 respectively, indicate different positions for the control valve for the fluid circuit illustrated in Fig. 6.
Figure 8:
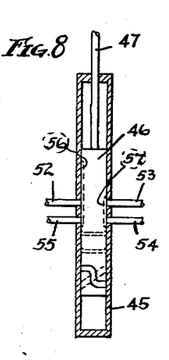

When the valve is positioned as illustrated in Figure 7, the fluid flowing thereto from the pumps through pressure conduit 52 will be by-passed by means of the groove 56 in the plunger 46 directly back to the return conduit 55 leading to the sump 43. There will be, therefore, no fluid flow in the fluid circuit to the actuating cylinders 24 and furthermore, the fluid contained in such last-named circuit is locked therein by the plunger 46 sealing the ends of conduits 53 and 54. With the valve in the position illustrated in Figure 7, therefore, the fluid pressure generated by the pumps on the wheels flows directly into the sump and the scoop bowl is securely locked in position due to the fact that there is no possibility of fluid circulating between conduits 53 and 54. If it is desired to lower the bowl by gravity, the valve is moved into the position illustrated in Figure 8. When occupying this position the groove 56 in the valve plunger again by-passes the fluid from the pump supplied in conduit 52 directly to the return conduit 55 and thence to the sump without in any way affecting the fluid flow in the closed circuit containing the bowl actuating pistons. When the valve plunger 46 occupies the position illustrated in Figure 8, however, a groove 57 on its outer periphery is brought to a position opposite the ends of conduits 53 and 54, so that the fluid is permitted to circulate in this closed circuit. The weight of the bowl, therefore, being effective to move the pistons 23 axially within the cylinders 24 is permitted to settle gradually by gravity as the fluid circulates in the closed path, which includes the opposite ends of the cylinders 24.

Figure 9:
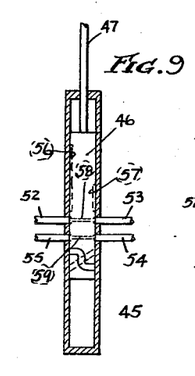

If it is desired to bring pressure to bear to force the bowl downwardly into the ground or into the collecting position, the valve will be moved into the position illustrated in Figure 9. When the valve occupies this position, conduits 52 and 55 are respectively placed in communication with conduits 53 and 54 by means of ducts 58 and 59 extending from the body of the valve plunger. When the valve is in this position, therefore, the fluid pressure generated by the pumps on the wheels of the scoops is caused to flow directly to the cylinders 24 and the pistons 23 are accordingly moved to the right as viewed in Figure 3 and the bowl forced into the ground. The fluid in the right-hand end of the cylinders 24, as viewed in Figure 3, flows back to the sump through conduits 54 and 55.

Figure 10:
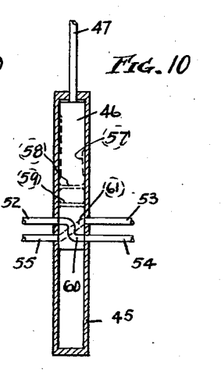

After the filling operation has been completed and it is required to elevate the bowl by means of force, or if it is desired to elevate the bowl from the carrying position to the dumping position, the valve will be brought into the position illustrated in Figure 10. When the valve is in this last-named position, conduits 52 and 55 will be brought into communication, respectively, with conduits 54 and 53 by means of branched ducts 60 and 61. The only difference between the results obtained by the valve position as illustrated in Figure 10 and the results of the position illustrated in Figure 9 is that the fluid under pressure from the pumps is supplied to the right-hand end of the cylinders 24, as viewed in Figure 3, and the pistons 23 accordingly move to the left to effect a counter-clockwise rotation of the triangular-shaped members 12. The fluid in the left end of the cylinders 24 flows back to the sump through conduits 53, 61 and 55. The piston 46 in the valve is always returned to the position illustrated in Figure 7 when not moved upwardly under the influence of the rope 48 by a spring 62 which, at one end, is connected to the frame and at the other end is connected to a bracket associated with the upper end of the piston rod 47.

The provision of the surge chambers 40 associated with each of the pumps is effective to taper out any pulsations which might have a tendency to cause a jerky movement of the bowl.

It is within the contemplation of this invention that should the above described form of construction be employed in combination with a tractor or like power vehicle which is adapted to supply fluid under pressure for the purpose of effecting the above defined actuation of the bowl moving pistons, the pressure conduit 41 may have a connection associated therewith whereby a supply line 41a may be carried from a pump 29a on the tractor and the return conduit 42, instead of passing the fluid to the pump cylinders 29, may likewise carry the fluid through the conduit 42a to a sump 43a associated with the pump 29a on the tractor, so that the bowl may be actuated by the pistons 23 and the cylinders 24 by fluid pressure generated on the tractor instead of by the pumps on the wheels of the scoop. If a pump on the tractor or any pump separate from the scoop is employed for the purpose of generating the necessary fluid pressure, then the pumps on the scoop may be either removed or some by-pass conduit provided so that such pumps on the scoop may be rendered temporarily ineffective during the time when the fluid pressure is supplied from the external source.

The particular link arrangement comprising the pivotal supported triangular-shaped bracket members 12 and the forwardly extending arms 17 which are employed for the purpose of supporting and manipulating the scoop bowl, effect a desirable movement of such bowl during operating conditions which has not been accomplished by arrangements employed heretofore.

Figures 12, 13:
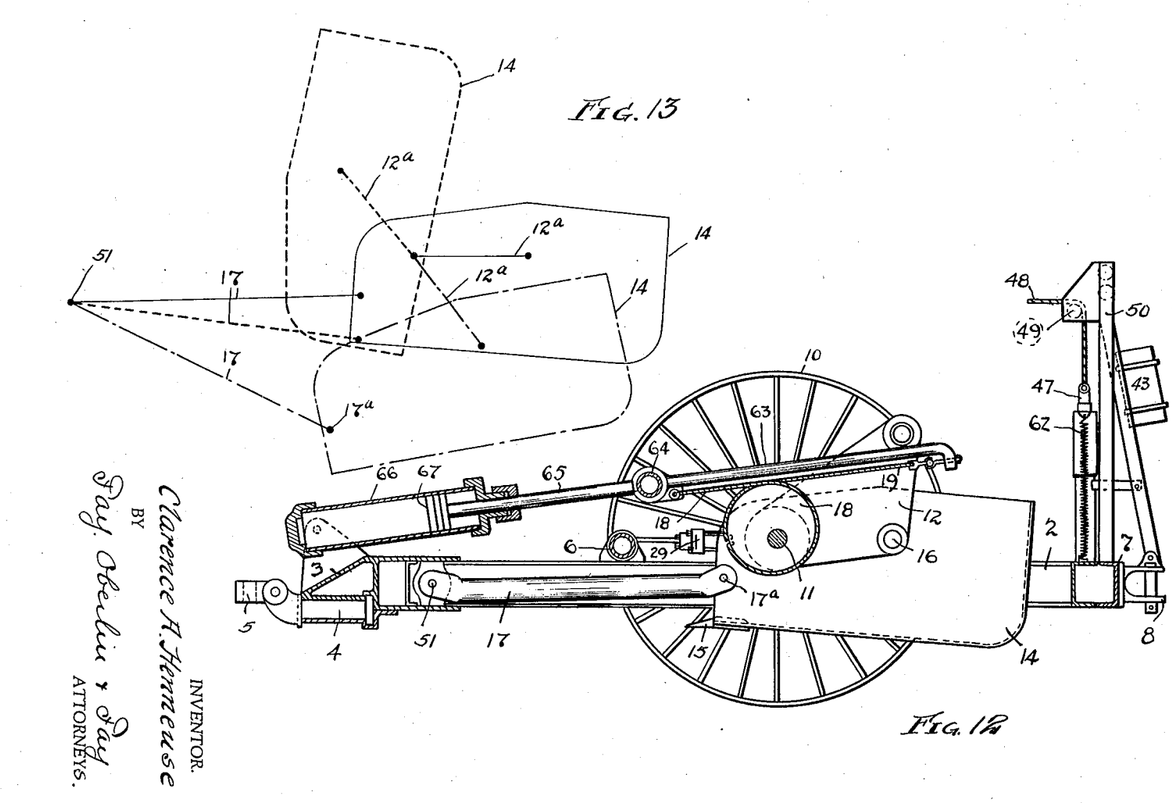
Figure 12 is a part sectional, part side elevational view of the apparatus illustrated in Figure 11.
Figure 13 is a diagrammatic representation of the scoop bowl moved into several operating positions.

Three selected positions of the scoop bowl are illustrated in Figure 13, in which the lowermost broken line position is that which is occupied by the bowl during the collecting operation. A central full-line position is the carrying or conveying position of the bowl, such position being likewise illustrated in Figures 12 and 13. The uppermost dotted line position of the bowl is its dumping position. It is to be understood, of course, that by a proper actuation of the central control valve 46, the bowl 14 may be arrested in any position intermediately of the limits of travel of the bowl, should conditions of operation of the scoop require that the bowl be arrested in any such intermediate position. In the graphical representation in Figure 13, the link 17 has been given like reference character and a line joining the axes of shafts 11 and 16, which is the lever arm of the bracket 12, has been given the reference character 12a.

As the bracket member 12 is rotated in a clockwise direction, the length of the link 17, the distance between the axes of the gudgeon 16 and the axle 11 and between the axes of the axle 11 and the pin 17a are, as illustrated in the drawings, so proportioned that as the bowl descends, the bottom thereof will be inclined downwardly towards the ground so that the bowl will enter the ground in the easiest possible fashion. This same proportioning of the connecting and supporting links for the bowl, when the bowl is moved from the collecting to the conveying position, causes the edge and bottom thereof to reverse the above described path; that is, as the bowl is elevated, the cutting edge 15 is moved rearwardly with respect to the axes of the ground wheels 9 and 10 and this greatly facilitates the removal of the bowl out of the ground either when a load of material has been collected or if the forward cutting edge should strike some immovable obstruction.

As the triangular-shaped members 12 are rotated in a counter-clockwise direction from the position illustrated in Figure 3, the illustrated proportions of link lengths cause the rear end of the bowl to elevate sharply so that the bowl substantially rotates about the axes of the axles 11. This definite proportioning of the links for supporting the scoop bowl effects the most desirable movement of the bowl, as above described, in passing from any position to another and without the employment of any sliding draw-bars which have been previously employed and which have been found to be an unending source of annoyance and actual failure. By slight adjustment in the length of the arms 17, and such adjustment is contemplated by this invention, the path and character of movement of scoop bowl may be altered in any desirable fashion to best adapt the scoop to a particular use.

Figure 11:
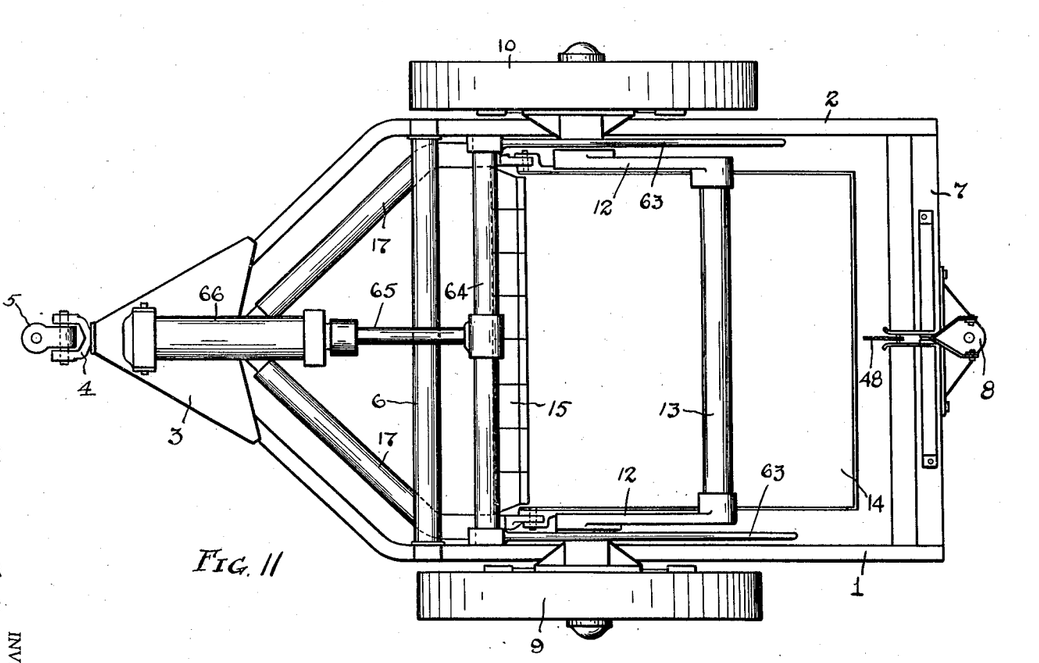
Figure 11 is a plan view of an alternative form of construction.

It will be noted that in the form of construction above described and illustrated most clearly in Figures 1 to 10, the scoop bowl is actuated relatively to the frame by means of a pair of hydraulic jacks positioned on opposite sides of the bowl and interconnecting the sides of the bowl with the sides of the frame. Instead of employing this construction utilizing two jacks, I may actuate the bowl by using only a single jack arranged in the manner most clearly illustrated in Figures 11 and 12. When this construction is employed, the drums 18 will be provided on opposite sides of the bowl as illustrated in the previously described construction. The piston rods 21 are supplanted, however, by means of arms 63 to which are connected the ends of the ropes 19 and 20 similarly to the manner in which such ropes were connected to the rods 21. The forward ends of the rods 63 are secured to the transversely extending bracket member 64 which, centrally, has a piston rod 65 secured thereto. The forward end of the connecting rod 65 extends into a cylinder 66 and carries a piston 67. The fluid supply circuit for a construction employing only one piston will be identical with that illustrated in Figure 6 with the exception that the conduits 53 and 54 will not be branched to extend to two jacks but will be carried to only one jack. Otherwise the construction and operation of the apparatus is identical with that previously explained so that like reference characters will be employed to designate like parts.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a wheeled scoop the combination of a frame, a scoop pan mounted for movement relative to said frame, and means for movably supporting said pan comprising a link oscillatably secured at its forward end to a fixed axis on said frame and at its rear end to said pan, another link oscillatably supported on a fixed axis adjacent the forward end of said pan and oscillatably engaging said pan rearwardly of said first-named link, and means for actuating and securing said last named link.

2. In a wheeled scoop, the combination of a wheeled frame, a scoop pan mounted for movement relative to said frame, and means for movably supporting said pan comprising two sets of links respectively secured at their forward ends to fixed axes spaced longitudinally on said frame and at their rear ends to axes spaced longitudinally on said pan, and means for actuating and arresting in a selected position said rearmost set of links.

3. In a wheeled scoop, the combination of a wheeled frame, a scoop pan mounted for movement relative to said frame, and means for movably supporting said pan comprising two sets of links respectively secured at their forward ends to fixed axes spaced longitudinally on said frame and at their rear ends to axes spaced longitudinally on said pan, said links so proportioned that arcuate movement of one set is effective to move said pan into and out of gathering, conveying and forward dumping positions, and means for actuating and arresting in a selected position one set of said links.

4. In a wheeled scoop, the combination of a wheeled frame, a scoop pan mounted for movement relative to said frame, and means for movably supporting said pan comprising two sets of links respectively secured at their forward ends to fixed axes spaced longitudinally on said frame and at their rear ends to axes spaced longitudinally on said pan, and means for actuating and arresting in a selected position said rearmost set of links, said means comprising hydraulic jack means energized by rotation of the wheels supporting the scoop.

5. In a wheeled scoop, the combination of a wheeled frame, a scoop pan mounted for movement relative to said frame, and means for movably supporting said pan comprising two sets of links respectively secured at their forward ends to fixed axes spaced longitudinally on said frame and at their rear ends to axes spaced longitudinally on said pan, said links so proportioned that arcuate movement of one set is effective to move said pan into and out of gathering, conveying and forward dumping positions, and means for actuating and arresting in a selected position one set of said links, said means comprising hydraulic jack means energized by rotation of the wheels supporting the scoop.

6. In a traveling material handling apparatus, a scoop, a frame upon which said scoop is mounted by links, a link, rotatably pivoted at its forward end to said frame and rotatably pivoted at its rearward end to the forward portion of said scoop, another link, rotatably pivoted at its forward end to said frame near the forward end of said scoop and above the rearward connection of said first named link, and rotatably pivoted at its rearward end to a rearward portion of said scoop, and means whereby said last-named link may be partially rotated about its forward pivoted connection, said means including a double-acting piston adapted through its reciprocation to revolve said link, a cylinder inclosing the head of said piston, and means whereby liquid under pressure is selectively supplied to said cylinder on either side of said piston head, said last-named means comprising a closed system including a pressure device operated by movement of said apparatus as it travels forward, a control valve, said cylinder and a liquid within said closed system.

7. In a traveling material handling apparatus, a scoop, a frame upon which said scoop is mounted by links, a link, rotatably pivoted at its forward end to said frame and rotatably pivoted at its rearward end to the forward portion of said scoop, another link, rotatably pivoted at its forward end to said frame near the forward portion of said scoop and above the rearward connection of said first-named link, and rotatably pivoted at its rearward end to a rearward portion of said scoop, and means whereby said last-named link may be partially rotated about its forward pivoted connection.

8. Material handling apparatus comprising in combination a wheeled frame, a scoop mounted for movement relative to said frame, hydraulic means adapted to effect such movement, and means, self-contained within said apparatus, whereby fluid is continuously pumped during movement of said wheeled frame for the supply of said hydraulic means, which self-contained means constitutes a closed system containing a fluid and includes said hydraulic means, a pressure pump actuated by the rotation of a wheel of said apparatus, a control valve, a surge chamber, suitable conduits connecting said hydraulic means, said surge chamber, said pump and said valve, and a fluid within said system.

9. Material handling apparatus comprising in combination a wheeled frame, a scoop mounted for movement relative to said frame, hydraulic means adapted to effect such movement, and means, self-contained within said apparatus, whereby fluid is continuously pumped during movement of said wheeled frame for the supply of said hydraulic means, which self-contained means comprise a cam mounted on a wheel of said apparatus, a pressure pump mounted on the frame of said apparatus with its plunger in operative contact with said cam, said hydraulic means for effecting movement of said scoop, a control valve, a surge chamber, conduits connecting said elements and making therewith a closed system, and a fluid within said system.

10. In a wheeled scoop, the combination of a wheeled frame, a scoop pan mounted for movement relative to said frame, and means for effecting such relative movement and to secure said pan in a selected position relative to said frame, said means including hydraulic jack means, fluid pumping means energized by rotation of the wheels supporting the scoop, conduit means interconnecting said jack means and said pumping means and forming therewith a closed system, valve means in said closed system whereby the part of such system including said jack means may be closed off to secure the scoop in selected position, and a liquid substantially filling such system.

CLARENCE A. HENNEUSE.